United States Patent [19]

Calabrese

[11] 4,383,454

[45] May 17, 1983

[54] REVERSIBLE SLIP CLUTCH

[75] Inventor: Richard A. Calabrese, Newtown, Conn.

[73] Assignee: Pitney Bowes Inc., Stamford, Conn.

[21] Appl. No.: 166,664

[22] Filed: Jul. 7, 1980

[51] Int. Cl.$^3$ .................. F16H 5/06; F16D 21/04
[52] U.S. Cl. .................... 74/337.5; 74/329; 74/335; 74/527; 192/21; 192/51
[58] Field of Search ............. 74/361, 527, 404, 329, 74/361, 376, 377, 335, 337.5, 356; 192/21, 51

[56] References Cited

U.S. PATENT DOCUMENTS

| | | | |
|---|---|---|---|
| 2,288,722 | 11/1940 | Lear et al. ................. | 74/527 |
| 2,558,502 | 11/1948 | Williams .................... | 74/527 |
| 2,593,365 | 4/1952 | Thull ........................ | 120/42.03 |
| 2,939,324 | 6/1960 | Gilbert et al. ............ | 192/93 R |
| 2,950,490 | 8/1960 | Schwartz et al. ......... | 10/138 |

FOREIGN PATENT DOCUMENTS

| | | | |
|---|---|---|---|
| 507555 | 12/1954 | Italy ........................... | 74/527 |
| 741568 | 12/1955 | United Kingdom ........ | 74/361 |
| 2019963 | 11/1979 | United Kingdom ........ | 74/527 |

*Primary Examiner*—Rodney H. Bonck
*Assistant Examiner*—L. D. Shannon, III
*Attorney, Agent, or Firm*—Lawrence E. Sklar; William D. Soltow, Jr.; Albert W. Scribner

[57] ABSTRACT

A reversible slip clutch, which comprises a first shaft, a first spur gear driven by an external source, a second spur gear rotatably mounted at one end of said first shaft, to be rotated by said first spur gear in a direction opposite to the rotation of the first spur gear, a second shaft, a third spur gear rotatably mounted at one end of said second shaft to be rotated by said first spur gear in a direction opposite to the rotation of the first spur gear, a fourth spur gear rotatably mounted inwardly of said second spur gear at the other end of said first shaft, a fifth, output spur gear rotatably mounted inwardly of said third spur gear at the other end of said second shaft, said output spur gear engaging said fourth spur gear, and means for providing alternate inward pressure to said second and third spur gears to thereby urge said second spur gear to frictionally engage said fourth spur gear and said third spur gear to frictionally engage said fifth spur gear.

6 Claims, 7 Drawing Figures

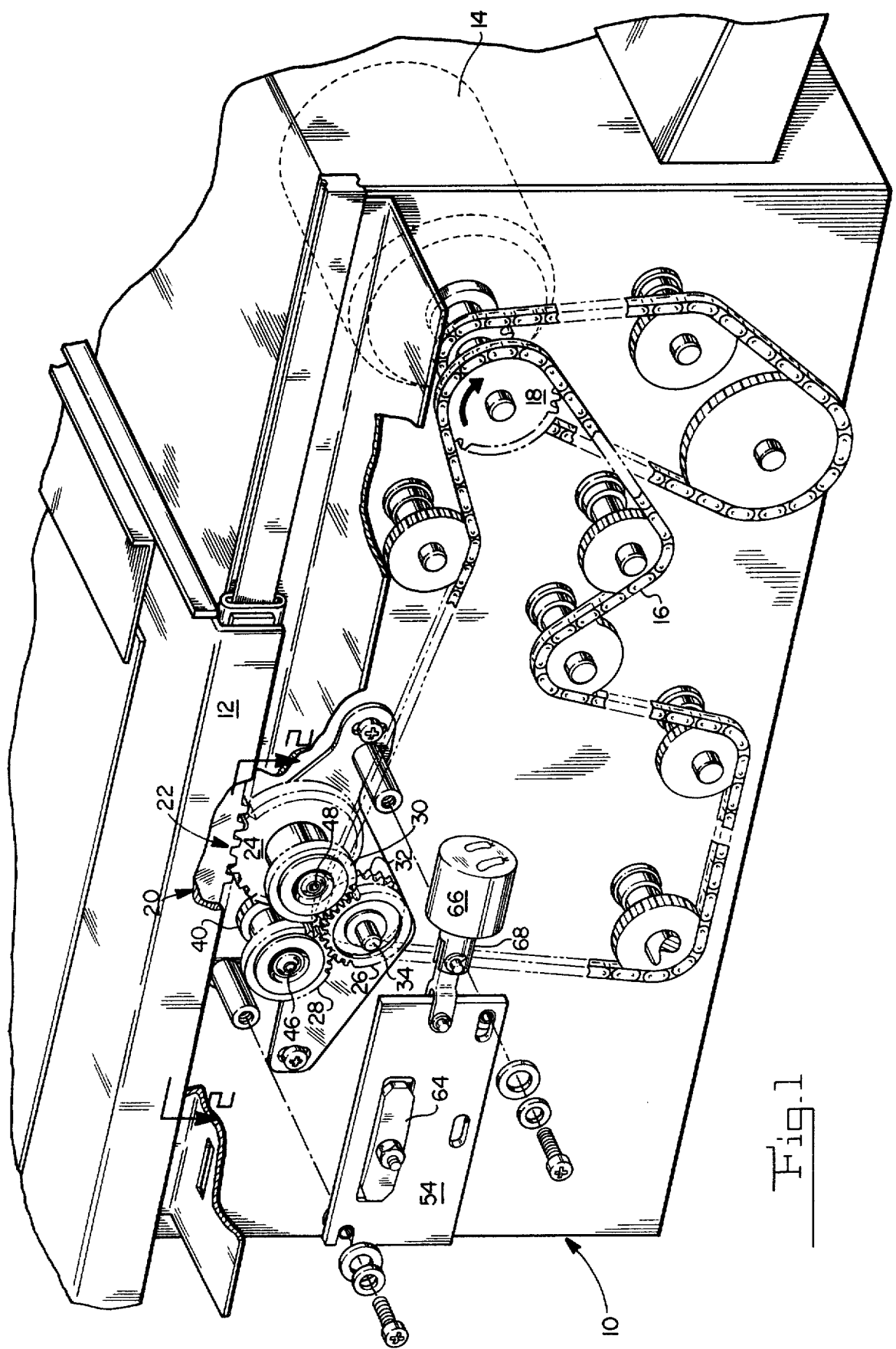

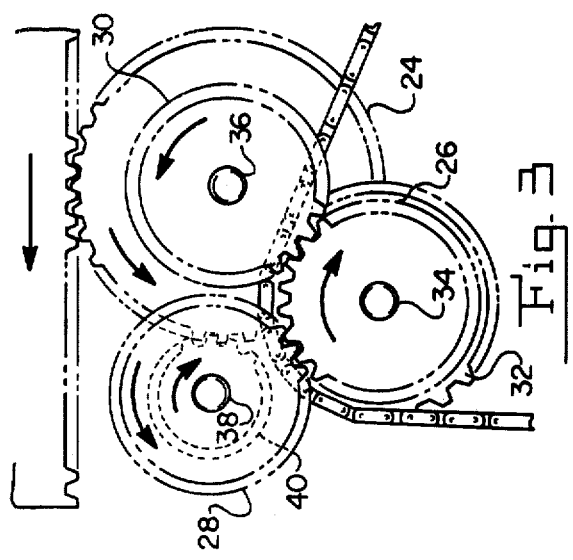
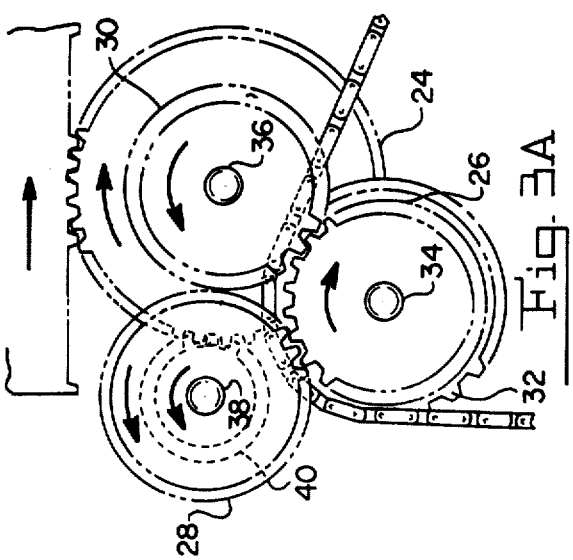
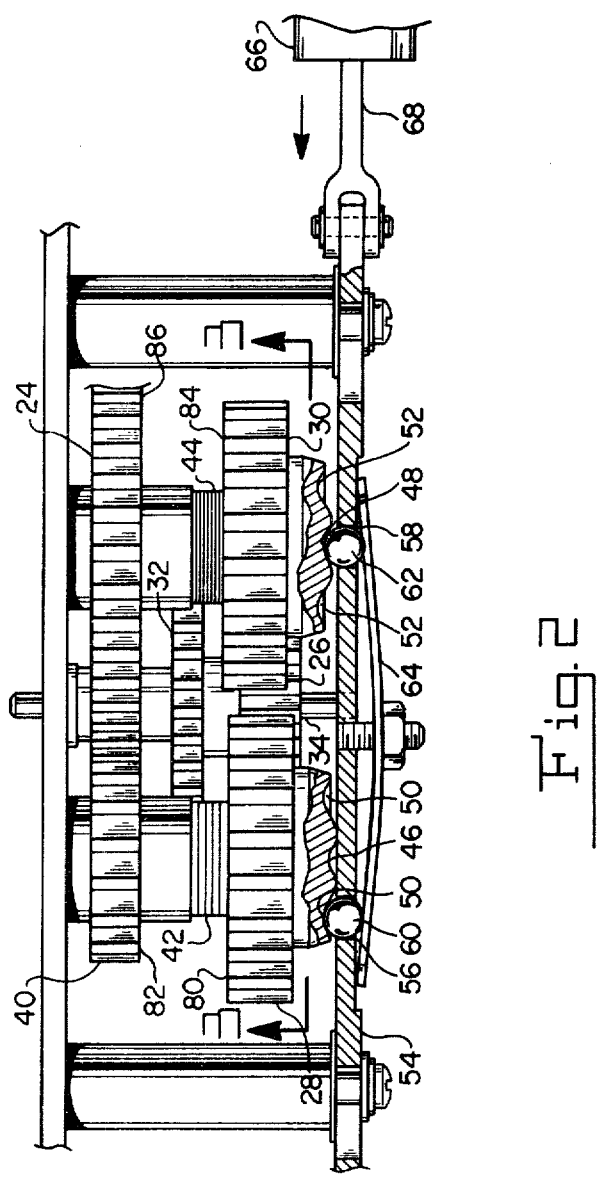
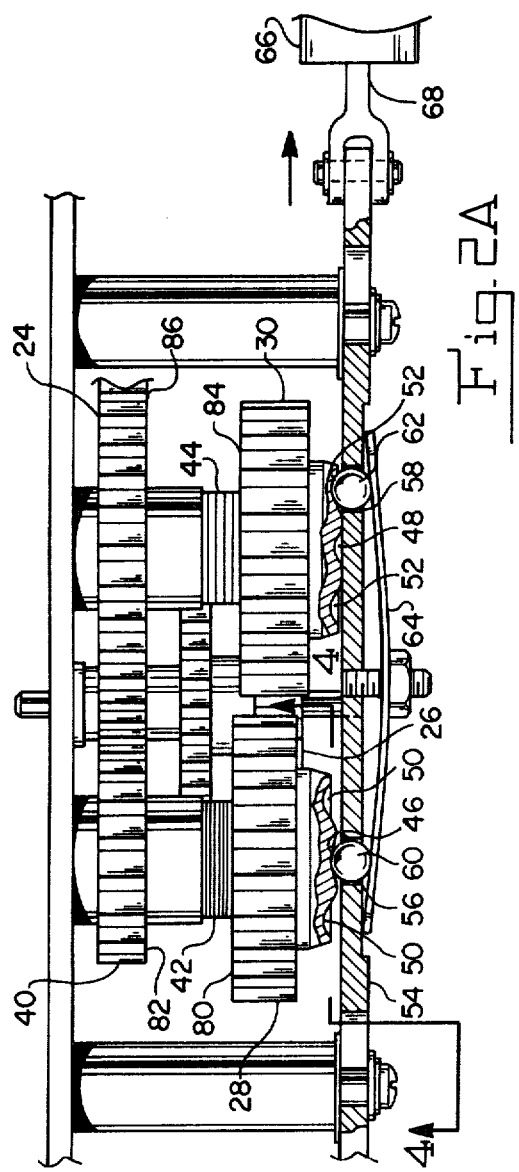

REVERSIBLE SLIP CLUTCH

BACKGROUND OF THE INVENTION

The instant invention relates to a clutch which provides a means of reversing a drive direction, and more particularly to such a clutch having separate overload protection in either direction.

Many machines, such as electrophotocopying machines having a reciprocating carriage to scan expose a document to be copied, have components which in the course of a cycle of movement must reverse direction. Such machines typically have an endless drive member, such as a drive chain, and rely on clutching devices to reverse the direction of movement of the driven component. The prior art clutches have generally proven satisfactory, and some even include the ability to separate the drive power from the driven component in the event of an overload on the driven component, which may, for example, come about as result of an accidental jam. In an electrophotocopier, the reciprocating carriage could accidentally jam against a person and cause injury to the person and possible damage to the photocopier. The instant invention accordingly provides a clutch which can reverse the direction of a drive input and which protects against an overload in either direction, but which comprises significantly fewer parts than similar prior art reversible, slip clutches.

SUMMARY OF THE INVENTION

The instant invention provides a reversible slip clutch, which comprises a first shaft, a first spur gear driven by an external source, a second spur gear rotatably mounted at one end of said first shaft to be rotated by said first spur gear in a direction opposite to the rotation of the first spur gear, a second shaft, a third spur gear rotatably mounted at one end of said second shaft to be rotated by said first spur gear in a direction opposite to the rotation of the first spur gear, a fourth spur gear rotatably mounted inwardly of said second spur gear at the other end of said first shaft, a fifth, output spur gear rotatably mounted inwardly of said third spur gear at the other end of said second shaft, said output spur gear engaging said fourth spur gear, and means for providing alternate inward pressure to said second and third spur gears to thereby urge said second spur gear to frictionally engage said fourth spur gear and said third spur gear to frictionally engage said fifth spur gear.

BRIEF DESCRIPTION OF THE DRAWINGS

FIG. 1 is a partial perspective view of an electrophotocopying machine employing a clutch according to the instant invention;

FIG. 2 is a top plan view in partial section taken on the plane indicated by the line 2—2 in FIG. 1;

FIG. 2A is the same as FIG. 2 except it shows a different position for the clutch actuating plate;

FIG. 3 is a sectional view taken on the vertical plane indicated by the line 3—3 in FIG. 2;

FIG. 3A is the same as FIG. 3 except it shows the motions corresponding to the position of the clutch actuating plate shown in FIG. 2A;

DETAILED DESCRIPTION

Figure 4:
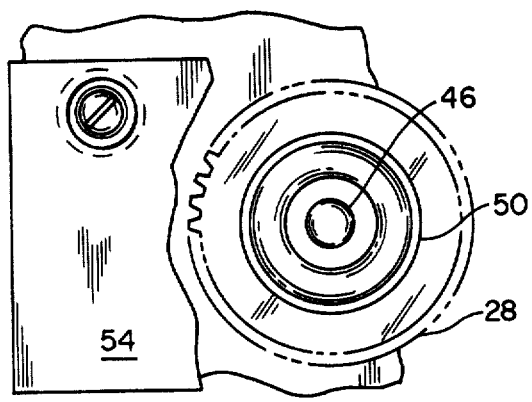
FIG. 4 is a sectional view taken on the vertical plane indicated by the line 4—4 in FIG. 2A.

In describing the preferred embodiment of the instant invention, reference is made to the drawings, wherein there is seen in FIG. 1 an electrophotocopying machine generally designated 10 having a reciprocating carriage 12 for scan exposing an original document (not shown) to be copied. A motor 14 drives a continuous main drive chain 16 off a main drive sprocket 18. The drive chain 16 further engages various idler and drive sprockets, the drive sprockets being drivingly connected to the various feed roller pairs operating to convey the copy paper (not shown) through is processing stations, to the developing station and to the carriage drive system generally indicated at 20. A rack gear 22 mounted on the underside of the carriage 12 engages a pinion gear 24 of drive system 20 thereby coupling the motor 14 to the carriage 12.

The drive system 20 is shown to comprise a triangular arrangement of a first spur gear 26, a second spur gear 28 and a third spur gear 30. A drive sprocket 32 is keyed to a shaft 34 to which the first spur gear 26 is also keyed. The drive sprocket 32 drivingly engages the main drive chain 16. The second spur gear 28 is rotatably supported at one end of a shaft 38, while the third spur gear 30 is rotatably supported at one end of a shaft 36 (see FIGS. 3 and 3A). A fourth spur gear 40 is rotatably mounted inwardly of the second spur gear 28 at the other end of the shaft 38. The fifth spur gear is the pinion gear 24 described above, which is rotatably mounted inwardly of the third spur gear 30 at the other end of the shaft 36.

Rotatably mounted on the shaft 38 between the second spur gear 28 and the fourth spur gear 40 is a first slip clutch friction disk 42. Similarly, rotatably mounted on the shaft 36 between the third spur gear 30 and the fifth spur gear 24 is a second slip clutch friction disk 44. The disks 42 and 44 may be formed from almost any cork or fiber composition. The second spur gear 28 includes, in its outward surface, a hemispherical recess 46, while the third spur gear 30 includes, in its outward surface, a hemispherical recess 48. Surrounding the hemispherical recess 46 in the outward surface of the second spur gear 28 is an outer race 50, while surrounding the hemispherical recess 48 in the outward surface of the third spur gear 30 is an outer race 52. As best seen in FIGS. 2 and 2A, the recesses 46 and 48 are shallower than the races 50 and 52.

A reciprocating bar 54 is disposed adjacent the outer surfaces of the gears 26, 28 and 30. The bar 54 includes a pair of apertures 56 and 58 which contain a pair of balls 60 and 62 held in place by a leaf spring 64. A solenoid 66 has a reciprocating arm 68 whose line of action is perpendicular to the shafts 36 and 38. The reciprocating arm 68 engages the bar 54 in order to move the bar 54 back and forth, as further explained below.

The first spur gear 26, as heretofore explained, is driven by the drive chain 16 and drive sprocket 32. As the first spur gear 26 rotates clockwise, the second spur gear 28 and the third spur gear 30 are rotated counterclockwise. As an inward pressure is exerted on the third spur gear 30, the friction developed between the third spur gear 30, the second slip clutch friction disk 44 and the fifth output spur gear 24 will cause the fifth output spur gear 24 to rotate in a counterclockwise direction as long as there is no inward pressure on the second spur gear 28. If an inward pressure is exerted on the second spur gear 28, friction between the second spur gear 28, the first slip clutch friction disk 42 and the fourth spur gear 40 will cause the fourth spur gear 40 to rotate counterclockwise, and if there is no inward pressure on the third spur gear 30 the fourth spur gear 40 will rotate the fifth, output spur gear 24 in a clockwise direction.

The inward pressures referred to above are determined by the position of the reciprocating bar 54. When the bar is moved to the left, as seen in FIG. 2, the ball 60 is in the outer race 50 while the ball 62 is in the recess 48. Since the recesses are shallower than the outer races, a ball situated in a recess will generate an inward pressure while a ball situated in an outer race will not generate an inward pressure. Accordingly, when the bar 54 is in the position shown in FIG. 2, an inward pressure is developed on the third spur gear 30. When the bar is moved to the right, as seen in FIG. 2A, the ball 60 occupies the recesses 46 while tha ball 62 occupies the outer race 52 and an inward pressure is developed on the second spur gear 28. Thus, the location of the bar 54 and the balls 60 and 62 therein determine the direction of rotation of the output spur gear 24, which in turn determines the direction of movement of the reciprocating carriage 12. If an overload or jam is felt at the output spur gear 24 while driving in either direction, the slip disks 42 and 44 will allow the spur gear 24 to free wheel (slip).

It should be noted that in some applications the friction disks 42 and 44 can be eliminated by using dissimilar metals (e.g. oil impregnated bronze and hardened steel) for the mating surfaces 80 and 82 of the hubs of the gears 28 and 40 respectively and for the mating surfaces 84 and 86 of the hubs of the gears 30 and 24 respectively.

Figure 5:
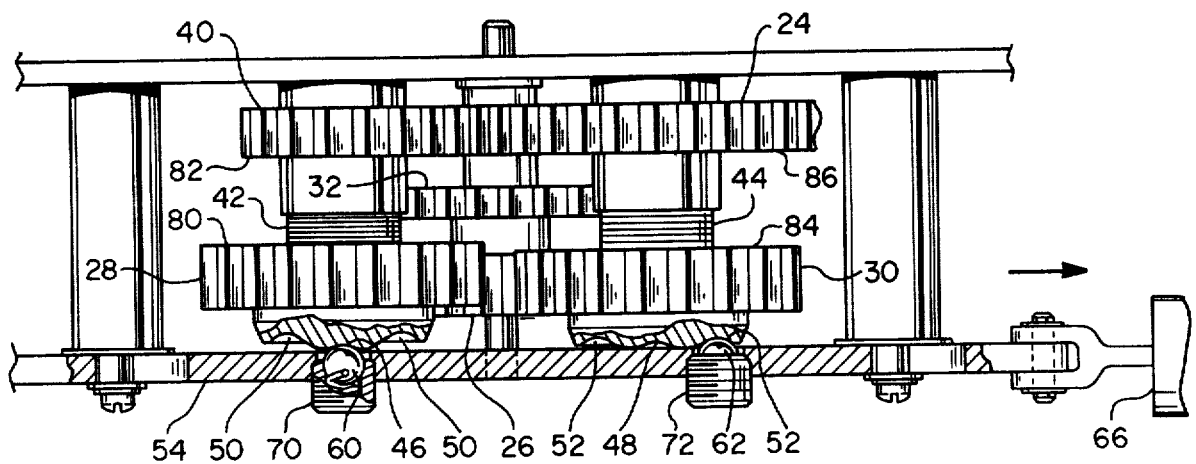
FIG. 5 is a top plan view in partial section, similar to FIG. 2, showing an alternative embodiment of a clutch according to the instant invention.

FIG. 5 shows an alternate embodiment which is identical to the embodiment shown in FIGS. 2 and 2A, except that the leaf spring 64 is replaced by a pair of ball plungers 70 and 72 in order to provide a capability of adjusting the pressure exerted by each of the balls 60 and 62, thereby independently varying the slip force on each spur gear 28 and 30.

Inasmuch as certain changes may be made in the above described invention without departing from the spirit and scope of the invention, it is intended that all matter contained in the above description or shown in the accompanying drawings shall be interpreted in an illustrative rather than limiting sense. And, it is intended that the following claims by interpreted to cover all the generic and specific features of the invention herein described.

What is claimed is:

1. A reversible slip clutch, comprising:
    a first shaft;
    a first spur gear driven by an external source;
    a second spur gear rotatably mounted at one end of said first shaft to be rotated by said first spur gear in a direction opposite to the rotation of the first spur gear;
    a second shaft;
    a third spur gear rotatably mounted at one end of said second shaft to be rotated by said first spur gear in a direction opposite to the rotation of the first spur gear;
    a fourth spur gear rotatably mounted inwardly of said second spur gear at the other end of said first shaft;
    a fifth, output spur gear rotatably mounted inwardly of said third spur gear at the other end of said second shaft, said output spur gear engaging said fourth spur gear; and
    a reciprocating bar having a line of action perpendicular to said first and second shafts for providing alternate inward pressure to said second and third spur gears to thereby urge said second spur gear to frictionally engage said fourth spur gear and said third spur gear to frictionally engage said fifth spur gear, said reciprocating bar including a pair of apertures and a pair of balls seated in said apertures, and the second and third spur gears each including in its outward surface a hemispherical recess and an outer race deeper than and surrounding the hemispherical recess for receiving said balls, whereby when on ball occupies a recess the other ball occupies an outer race.

2. The clutch of claim 1, additionally comprising a solenoid for moving the reciprocating bar.

3. The clutch of claim 2, wherein the reciprocating bar includes a leaf spring for retaining the balls in their respective apertures.

4. In an electrophotocopying machine having a reciprocating carriage for scan exposing an original document to be copied, said carraige having a rack gear mounted thereon, the improvement comprising a reversible slip clutch, said slip clutch having:
    a first shaft;
    a first spur gear driven by an external source;
    a second spur gear rotatably mounted at one end of said first shaft to be rotated by said first spur gear in a direction opposite to the rotation for the first spur gear;
    a second shift;
    a third spur gear rotatably mounted at one end of said second shaft to be rotated by said first spur gear in a direction opposite to the rotation of the first spur gear;
    a fourth spur gear rotatably mounted inwardly of said second spur gear at the other end of said first shaft;
    a fifth, output spur gear rotatably mounted inwardly of said third spur gear at the other end of said second shaft, said output spur gear engaging said fourth spur gear and driving said rack gear; and
    a reciprocating bar having a line of action perpendicular to said first and second shafts for providing alternate inward pressure to said second and third spur gears to thereby urge said second spur gear to frictionally engage said fourth spur gear and said third spur gear to frictionally engage said fifth spur gear, said reciprocating bar including a pair of apertures and a pair of balls seated in said apertures, and the second and third spur gears each including in its outward surface a hemispherical recess and an outer race deeper than and surrounding the hemispherical recess for receiving said balls, whereby when one ball occupies a recess, the other ball occupies an outer race.

5. The improvement of claim 4, additionally comprising a solenoid for moving the reciprocating bar.

6. The improvement of claim 5, wherein the reciprocating bar includes a leaf spring for retaining the balls in their respective apertures.

* * * * *